Sept. 14, 1926.

H. A. SAGER 1,599,841

TREE REMOVER

Filed July 25, 1925

WITNESSES

INVENTOR
H. A. Sager
BY
ATTORNEYS

Patented Sept. 14, 1926.

1,599,841

UNITED STATES PATENT OFFICE.

HARRY A. SAGER, OF MISSOULA, MONTANA.

TREE REMOVER.

Application filed July 25, 1925. Serial No. 46,128.

My present invention relates generally to tree removers, and more particularly to that type of apparatus used in removing trees from the ground, wherein members are actually driven into the soil in order to cut below the roots of the tree and in order that the tree, with its roots and a part of the soil surrounding the roots, may be lifted bodily out of the ground and easily and quickly transported, and my primary object is the provision of an apparatus of this nature by means of which the operation may be quickly and conveniently carried out, the amount of necessary digging minimized, and all danger of the falling of earth away from the roots of the tree when the latter is lifted and transported, is done away with.

In the accompanying drawing which illustrates my present invention and forms a part of the specification, Figure 1 is a top plan view of my apparatus.

Figure 3 is a radial section taken along the line of one of the ground-entering staves.

Figure 1:
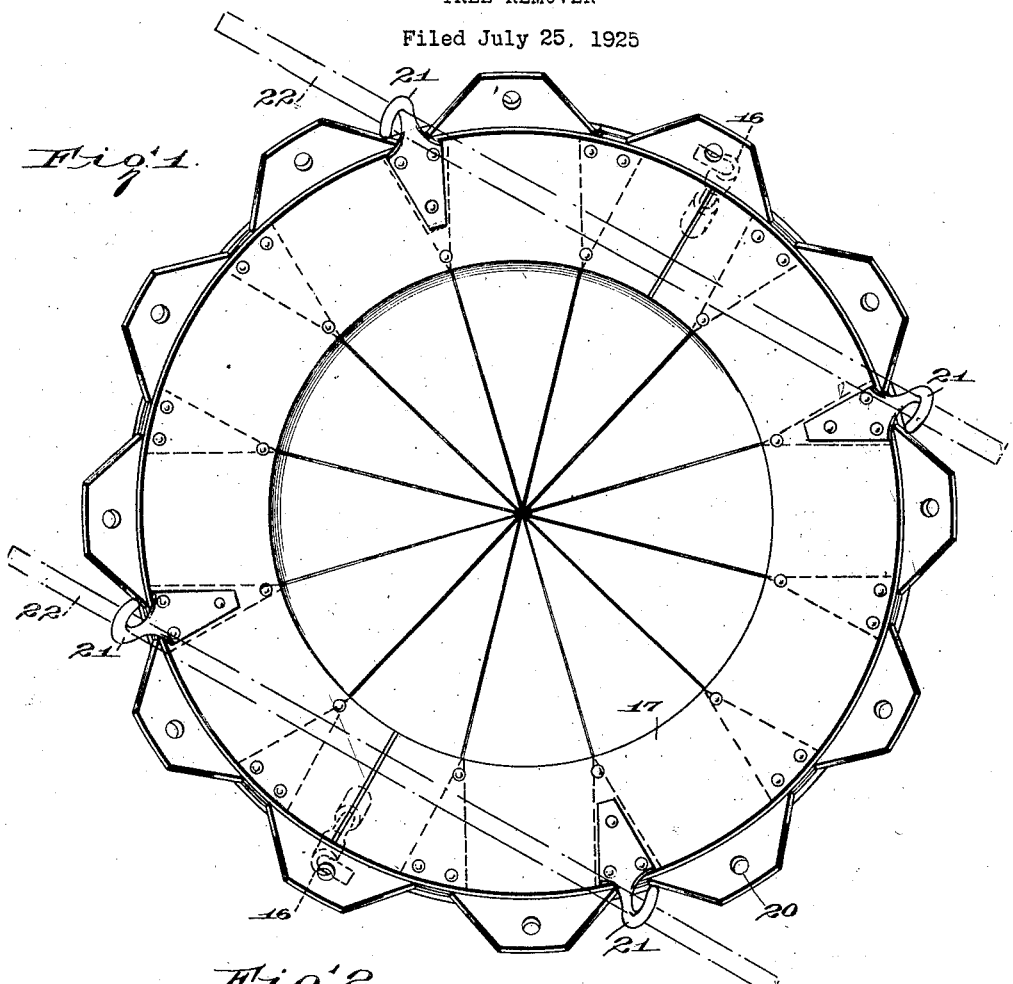
Figure 2:
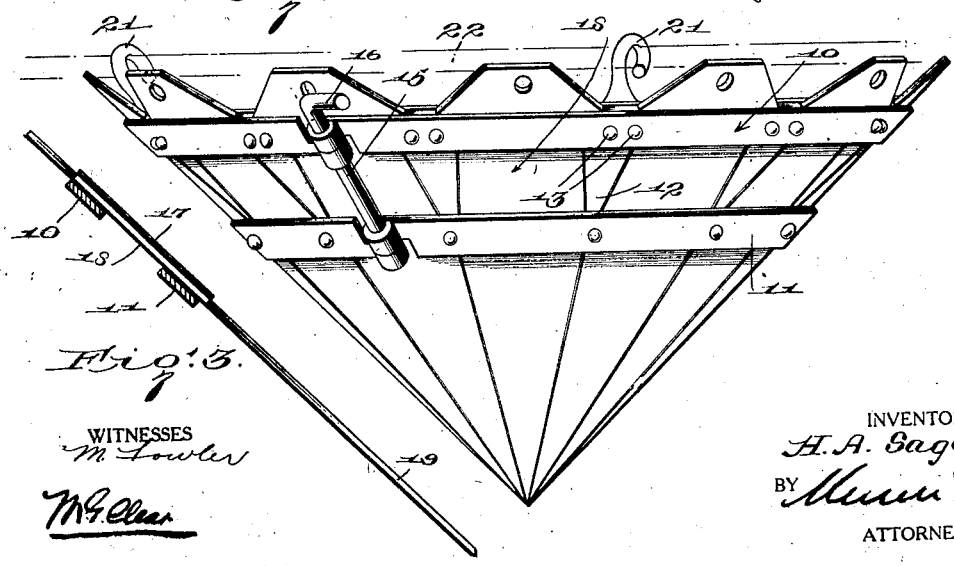
Figure 2 is a side view thereof.

Referring now to these figures my invention proposes an apparatus including a frame, the frame consisting of upper and lower hoops 10 and 11, connected and spaced apart and rigidly positioned with respect to one another by means of transversely connected wedge-shaped guides 12, the lower hoop 11 being smaller in diameter than the upper hoop 10 and both hoops being canted whereby the wedge-shaped connecting members or guides 12 are disposed in flat-wise contact with the inner surfaces of the hoops and may be rigidly connected thereto as by means of rivets 13.

The frame is preferably sectional to permit of ready positioning around the base of a tree and preferably within a shallow trench, the purpose of which is to center the frame around the tree and avoid lateral shifting thereof during the operation. In thus providing a two-part frame, the hoops 10 and 11 are in two parts with tubular portions 14 at their ends adapted to be connected by a rod 15 having an angular handle 16 at one end, and the inner guide band 17 forming a part of the frame, is likewise in two parts with their ends abutting adjacent to the connecting rods 15, said inner guide band being secured to the several guide blocks 12, preferably by the same rivets 13 utilized to connect the latter to the hoops 10 and 11, and the several members of the frame, namely the hoops 10 and 11, guide rods 12 and band 17 thus mutually contribute to the support of the frame and also cooperate to form guide spaces for the reception of a plurality of staves 18, the tapering lower portions 19 of which come together when the staves are driven into the ground so as to complete a basket-like arrangement of inverted cone-shape.

The staves 18 which are individually driven into the ground, are thus shaped to readily cut through the soil, and at their outer ends are widened to form side shoulders adapted to engage the ends of the guide blocks 12 when the staves are in their effective or operative position, and these outer ends of the staves are also provided with openings 20 which facilitate removal of the staves from the frame before the latter is placed in use around a tree, and for pulling out the staves when the tree has been placed in a new position.

It is preferable in utilizing the apparatus of my invention that the frame with the staves removed, be first placed and centered around the base of the tree to be removed, within a trench which need be only of sufficient depth to avoid lateral shifting of the frame. The staves are then individually driven through the guides of the frame into the ground and their lower tapering portions fit in engaging relation along their side edges with one another so that with all of the staves in the effective position, the apparatus presents a solid wall surrounding the tree with its roots and mass of soil which avoids all danger of loss of earth from around the roots of the tree when the latter is being lifted from the ground.

In addition to the foregoing and as shown in Figure 1, the frame may have at spaced points therearound upstanding hook like members 21 adapted to receive handle bars and the like indicated in dotted lines at 22 and which may be merely sections of pipe. These hook like members also serve as anchors for suitable hoisting apparatus where the tree is too large to lift by hand.

What I claim is:

1. In a tree remover, a sectional annular frame including upper and lower canted hoops of which the lower hoop is of less diameter than the upper hoop, guide blocks disposed transversely between and across the hoops and rigidly connecting and spacing the latter apart, an inner band secured to the guide blocks and through the latter to the said hoops and forming with the hoops and guide blocks an annular series of guide spaces, and a series of staves adapted to be driven into the ground through said guide spaces in inclined relation, having tapering lower portions whose side edges engage in the effective position to form a solid conical basket.

2. In a tree remover, a sectional annular frame including upper and lower canted hoops of which the lower hoop is of less diameter than the upper hoop, guide blocks disposed transversely between and across the hoops and rigidly connecting and spacing the latter apart, an inner band secured to the guide blocks and through the latter to the said hoops and forming with the hoops and guide blocks an annular series of guide spaces, and a series of staves adapted to be driven into the ground through said guide spaces in inclined relation, having tapering lower portions whose side edges engage in the effective position to form a solid conical basket, the abutting ends of the sections of the hoops having alined tubular portions, and connecting rods extending through said portions to lock the sections of the frame in abutting relation.

3. In a tree remover, a sectional annular frame having an outer part including upper and lower hoops, guide blocks forming rigid separators transversely of and connected to said hoops, and an inner part consisting of a band connected to the several guide blocks and rigidly spaced thereby from the hoops, the said guide blocks defining between the band and hoops a series of guide channels having approximately parallel sides around the frame, and a series of staves adapted to be driven into the ground through said guide channels.

4. In a tree remover, a sectional annular frame having an outer part including upper and lower hoops, guide blocks forming rigid separators transversely of and connected to said hoops, and an inner part consisting of a band connected to the several guide blocks and rigidly spaced thereby from the hoops, the said guide blocks defining between the band and hoops a series of guide channels having approximately parallel sides around the frame, and a series of staves adapted to be driven into the ground through said guide channels having portions adjacent to one end provided with approximately parallel side edges and having portions adjacent to the opposite end in the form of segments of a cone, for the purpose set forth.

HARRY A. SAGER.